June 28, 1966 N. V. MANSUETTO ETAL 3,258,539

ELECTRONIC SWITCHING TELEPHONE SYSTEM

Filed Aug. 13, 1962 5 Sheets-Sheet 1

INVENTOR.
N.V. MANSUETTO - D.F. SEEMANN
E.G. PLATT - W.K.C. YUAN

BY [signature]

ATTORNEY

ELECTRONIC SWITCHING TELEPHONE SYSTEM

Filed Aug. 13, 1962 5 Sheets-Sheet 2

ELECTRONIC SWITCHING TELEPHONE SYSTEM

Filed Aug. 13, 1962

3,258,539

ELECTRONIC SWITCHING TELEPHONE SYSTEM

Nicholas V. Mansuetto, Eric G. Platt, Donald F. Seemann, and William K. C. Yuan, Chicago, Ill., assignors to International Telephone and Telegraph Corporation Filed Aug. 13, 1962, Ser. No. 216,636
38 Claims. (Cl. 179—18)

This invention relates to electronic switching telephone systems and more particularly to systems using current controlled, self-seeking, switching networks.

Generally, electronic switching networks include a plurality of crosspoints interconnected to provide many alternative paths from any network inlet to any network outlet. One particular type of network which offers the best prospects for revolutionizing the switching industry is sometimes called a current controlled, self-seeking network. The details of this type network are shown in a U.S. Patent 3,204,044, entitled, "Electronic Switching Telephone System," granted August 31, 1965, Virgle E. Porter, and assigned to the assignee of this invention.

Briefly, a "self-seeking" network is one which has the ability to select a particular one of the many alternative paths between any two end-marked points. Stated another way, no in-network controls are required to complete a switch path between any selected inlet and outlet. A "current controlled" network depends upon the current flow over a completed path to hold the connection and an absence of current to release all unused crosspoints promptly upon a failure of a path to find its way through the network. This way excessive fan-out currents do not occur.

These current controlled, self-seeking networks are interposed between subscribed lines and switch path controlling links. The principle is that one of many links is assigned to serve the next call. Then a first or "originate" path finds its way from a calling line through the network to the assigned link. There certain call functions are completed, and then a second or "terminate" path finds its way from the called line through the same network to the same link. The link then "completes" the call by joining the two paths and a conversation may follow. When the originate path finds its way, we really do not care whether the path reaches one or another link. However, once the originate path does reach any link, that particular link is committed to serve a particular call. Thus, the terminate path must be extended to the committed link. When a call is over and the subscribers hang-up, the path is "released." Thus, the terms "originate," "terminate," "complete" and "release" are used hereinafter in the above sense.

From the foregoing, we reach a conclusion that the ideal system would allow the first or calling line paths to seize any idle link on a completely random basis. Why provide unnecessary controls? But the ideal system should force the second or called line paths through the network on a one-at-a-time basis. This way the second path may be forced into the committed link, thus eliminating any danger of connections to busy lines.

One way to accomplish this one-at-a-time, self-seeking, search is through the use of time sharing principles. That is, all other calls are locked out or inhibited from extending a path during the time required to complete the second path to the called line. However, this time sharing has sometimes left an unguarded interval when two or more calls race for the connection controlling link equipment just before or immediately after it is assigned.

Another problem centers about the reliability of common equipment which is used during the establishment of a call. More particularly, since the common equipments are absolutely essential to all switching activity, any failure of the assignment means completely destroys the capability of the entire system. In view of the dependence of modern society upon communications, it is apparent that such a failure can not be tolerated. Thus, common practice requires redundancy or duplication of all such critical equipment with alarm and transfer to stand by equipment if a failure occurs. This equipment redundancy is, however, quite expensive. Therefore, an elimination (or reduction in the cost of) circuits where a critical failure may occur represents a great step forward in the art.

Finally, since the current controlled, self-seeking, networks allow an elimination of network controls, there is an opportunity for effecting economies in the relatively small amount of common equipment that remains. For example, two or more connections are conventionally extended through the network to the links where the connections are joined to provide a completed speech path. Since these links are the focal points of the connections, it is common practice to provide at least some common circuits in the links. Thus, a link has various feature circuits for providing conversation timing, executive right-of-way, and the like. This practice is relatively expensive because few, if any, of these feature circuits are required in most calls.

Accordingly, an object of the invention is to provide new and improved electronic switching telephone systems. A more particular object is to realize all of the potentialities of current controlled, self-seeking networks. Thus, an object of the invention is to provide new and improved ways of assigning common equipment on a time shared basis without allowing any unguarded intervals when two or more independent connections may be faultily joined.

A further object is to provide electronic switching systems having a minimum number of points where critical failures can occur. Thus an object is to reduce equipment redundancy without impairing the system dependability. Quite the contrary, an object is to improve the system dependability.

Another object of the invention is to realize all of the economies that self-seeking networks offer. Here an object is to hold common, general purpose equipments only during the intervals while such general purpose equipments are actually needed and to release such equipments to the use of other calls immediately after they are no longer needed. Similarly an object is to provide some links having general capabilities and other links having special capabilities with a transfer from the general to the special links as soon as possible after a call is established.

In accordance with one aspect of this invention, an electronic switching telephone system comprises a self-seeking, current controlled, electronic switching network. Subscriber lines are connected to one side of the network, and connection controlling link circuits are connected to the other side of the network. During individual time frames, an allotter enables idle links to be seized on a random basis by switch paths extending through the network from each originating or calling line. After all preliminary functions are completed and a call is ready to be terminated to a called line, the link that was seized sends a signal over a bus that is common to the entire system. This signal inhibits all lines (except the called line) from originating a call. The called line then extends a connection on a one-at-a-time basis through the network to the link.

In accordance with another aspect of the invention, special features are provided responsive to the numerical value of dial pulses stored in the seized link. The term "features" indicates services not generally given during all calls but available during special calls. These features may include such things as: tie line trunking, conference trunking, centralized dictation, public address, code calling, key sending, executive right-of-way, group hunting, restricted service, camp-on-busy, and numerical control. To provide these features the links are divided into two groups. A first group has general capabilities for completing ordinary calls, and a second group has special capabilities for completing special feature calls. All calls are initailly extended to a general purpose link which detects the need for particular features equipment. Then, the general purpose link marks a features link, having the required capabilities. Thereupon, the general purpose link drops out of the connection and a path fires from the calling line through the network to the features link. The call is now completed under control of the features link. This way, expensive general purpose equipment is not held busy when special equipment is required and vice versa.

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram showing the principles of a telephone system constructed in accordance with the teachings of this invention;

FIGS. 2–5 include circuit schematic, block, and logic diagrams showing the details of the system; and FIG. 6 is a block diagram showing how FIGS. 2–5 are joined to provide a complete and understandable drawing.

GENERAL DESCRIPTION

FIG. 1 shows an exemplary telephone system utilizing a current controlled, self-seeking network 20 of the type shown in the above identified Porter application. Subscriber line circuits 21 connect to one side of the network 20, and connection controlling link circuits 22 connect to the other side. The link circuits are allotted in sequence by individually associated time frames produced by a marker or allotter 23. Common equipment 24 provides dial tone (DT), busy tone (BT), ringing tone (RT), and any other similar signals. Finally, a plurality of common busses 25 provide highways for controlling the system.

Many details of circuits use in this and similar systems are explained in the following co-pending U.S. patent applications, which are assigned to the assignee of the invention:

"Electronic Switching Telephone System" by Seemann-Haskins; S.N. 113,178, filed May 29, 1961, now U.S. Patent 3,204,038, granted August 31, 1965

"Electronic Switching Telephone System" by Haskins, Platt, and Dunlap; S.N. 147,532, filed October 25, 1961, now U.S. Patent 3,221,104, granted November 30, 1965

"Ring Counter and Marker" by William K. C. Yuan, S.N. 183,859, filed March 30, 1962, now U.S. Patent 3,200,-204, granted August 10, 1965

"Class of Service Telephone System" by Platt-Yuan; S.N. 204,807, filed June 25, 1962, now U.S. Patent 3,133,157, granted May 12, 1964.

The switching network 20 includes a plurality of cascaded matrices, one of which is shown at 30. Each matrix comprises horizontal and vertical multiples which intersect to provide electronic crosspoints, as at 31, for example. A PNPN diode connected across the multiples which intersect at each crosspoint has a current controlled switch "off" capability which allows switch paths to find their way between two end marked points. Thus end markings at points X and Y, for example, cause a self-seeking switch path to search through the network. An exemplary path that might be completed is shown by a solid, heavily inked line L1. In a similar manner, end markings at points X1, Y1 causes a path to find its way through the network, as over the heavily inked, dashed line L2, for example. If link 1 now joins the points Y, Y1, subscriber lines A, B are connected in a conversation path.

Each subscriber line terminates in a line circuit 21. That line circuit recognizes a request for a switch path condition and applies an end-marked potential to the line side of the network (e.g. point X) if the line circuit is not busy. Insofar as the network 20 is concerned this request produces the same effect regardless of whether it indicates a calling, a called, or a transfer condition.

The connection controlling links 22 are divided into two groups. A first group (exemplified by link 1 through link N) has general purpose capabilities and can control the extension of conventional calls through the network 20. A second or features group (exemplified by link 35) has special purpose capabilities and can control specific call features, such as: executive-right-of-way, conversation timing and camp-on busy, and others.

Each link is allotted to control a connection on a call function basis. That is, the allotter 23 is a free running device which produces cyclically recurring time frame which enable each link (in order) to complete a call function. For example, a switch path may be extended to link 1 during the time $t1$. The allotter then steps on to enable the next link during a time frame $t2$. Meanwhile link 1 receives dial pulse and perhaps other signals as well. During this time, the allotter produces link 1, identifying time frame $t1$ may return many times, with or without effect, depending upon link needs. Finally, however, a time comes when the link is ready to complete a connection. When the allotter next produces link 1 identifying time frame $t1$, a termination path is fired through the network.

Originally all calls are extended through the network to a general purpose link, such as link 1. Then, dial tone is returned from common equipment 24 through the link and network to the calling subscriber at station A who responds by dialing. If the digit pulses indicate that a special purpose features link is required, the general purpose link 1 applies a potential to conductor 36 to seize a features link 35. The features link 35 marks a point Y2. The link 1 drops out and an unanswered calling condition reappears in the calling line circuit which causes the line circuit to again mark the point X. Then a path fires from the line circuit point X through the network 20 to point Y2 and the features link circuit 35. Thereafter, the allotter assigns the general purpose link 1 to serve another call. Meanwhile, the features link 35 controls the completion of the original call.

The common busses 25 provide highways for extending connection controlling signals. In greater detail, the cable 40 include tens, units, and perhaps hundreds and thousands conductors. The line circuits uniquely connect to these cable 40 conductors in accordance with subscriber line numbers. A register in each link circuit connects to the other end of each of these conductors for selective marking purposes. For example, the line circuit of a subscriber line "23" connects to a second "tens" conductor and a third "units" conductor. If the digit "23" is dialed into a link register, that register marks the second and third conductors. This way only the line circuit for line "23" responds to controls extended from the link circuit over the second "tens" and third "units" conductors. This is explained in detail in the Seemann-Haskins application.

The conductors 41 are marked from the line circuits to control the access to certain features links. For example, line circuit A may mark conductors 41 to indicate an executive-right-of-way service, and line circuit B may mark conductors 41 to require conversation timing. Thus, if a calling line A connects with the general purpose "link 1" simultaneously with an executive-right-of-way class of service marking on conductors 41, and further if the digits dialed by the calling subscriber indicates a need for executive-right-of-way, then link 1 marks a conductor such as 36 to seize a special purpose executive-right-of-way features link 35. If a calling line B connects with the general purpose "link 1" simultaneously with a conversation timing marking on conductors 41, the "link 1" marks another conductor 36 and seizes another special purpose conversation timing features link 35.

A particularly useful feature of the network 20 is that many paths may fire from one line side, point of access X to many other link side, points of access Y. Or some paths may be released from some of the link side points Y, without releasing other link side paths. Thus, line A may be connected either simultaneously or sequentially to many links. For example, a call could begin in the general purpose link 1. Next, an executive-right-of-way features link could be called in to override a busy condition on a called line. Then the features circuit might drop out of the connection. Thereafter, public address and code call features links could be called in simultaneously to page called parties. Then these features links could drop out of the connection. Finally, many connections could be transferred from a number of general purpose links to a single conference call features link. Then the general purpose link would drop out of the connection. Those skilled in the art will readily perceive why other transfer of connections would be desired.

Reference may be made to the above identified William K. C. Yuan application for a disclosure of the "Class of Service" feature utilizing the conductors 41.

According to the invention, calls originate on a random basis and terminate on a one-at-a-time basis. This operation is controlled by the call enable circuit 42. More particularly, a common bus 43, 43' extends between all connection controlling link circuits and all line circuits. Normally the potential on this bus inhibits all line circuits and prevents the application of any end-marking potentials to the line side of the network 20 (points X, X1, for example). Thus, the subscriber lines may go off-hook (without immediate effect) at any time.

When the allotter 23 marks any idle link (link 1, for example), that link, acting through the common call enable circuit 42, pulses the call enable bus 43 to remove the inhibit from every line circuit. Each line circuit having an unanswered off-hook or request for a switch path condition marks its line side point of access to the network. For example, if both of the lines A, B are off-hook in an unanswered calling condition when bus 43 is pulsed, points X, X1 are marked simultaneously. Switch paths race from both marked points X, X1 in search of the marked link side point Y. Assuming that the path represented by the heavily inked line L1 wins the race, the potential difference between points X1, Y virtually disappears almost instantaneously. Then, no path can be completed from point X1 to any link. Link 1 removes the enable pulse from bus 43, and line circuit B is inhibited so that the line side, end-marking disappears from point X1.

When the allotter 23 allots the next idle link (link N, for example), that link pulses the call enable bus 43', and all line circuits having an unanswered off-hook or request for a switch path condition again mark the line side of the network. Again switch paths race out from all line side, end markings in search for the idle link. If the path is not completed from point X1, to a link, the X1 end-marking is again applied when the next idle link is assigned. The number of times that a line side, point of access is marked responsive to any single off-hook condition depends upon the grade of service (i.e. the amount of equipment provided). In one exemplary system, it was found that three seconds is the longest possible time required under any normally foreseeable operating conditions. An occurrence of the three second period is extremely unlikely; all reasonably assumed probabilities indicated a completion of a connection in a few milliseconds.

Ready to complete calls are switched through the network on a one-at-a-time basis. More specifically, assume that link 1 is seized, returns dial tone, and receives and stores digit pulses. Thereafter, and for the duration of the call, link 1 controls the potential on the call enable bus to indicate that link 1 is busy. Then signals are applied from link 1 to called number marking busses 40 to enable the single called line circuit that is identified by the markings. In that called line circuit, the potential on the call enable bus is inhibited. In all other line circuits the potential on the call enable bus prevents any other application of end-markings to the line side of the network during time frames *t1* which identify link 1. During time frame *t1*, while the other line circuits are inhibited by the potential on the call enable bus, the called line circuit marks its point of access to the network (point X1, for example) and the link 1 marks its point of terminate access (point Y1, for example). A switch path fires from the end-marked line side through the network to the end-mark link side.

Upon reflection, it is apparent calls originate on a random basis. That is, all originating calls race for every idle link. Thus, the final commitment of any link to any call is left to the mercy of chance. But the calls terminate on a one-at-a-time basis. That is, when a call is ready to complete, the one particular called line is committed to a connection with the one particular link having the called number stored therein.

DETAILED DESCRIPTION

Figure 1:
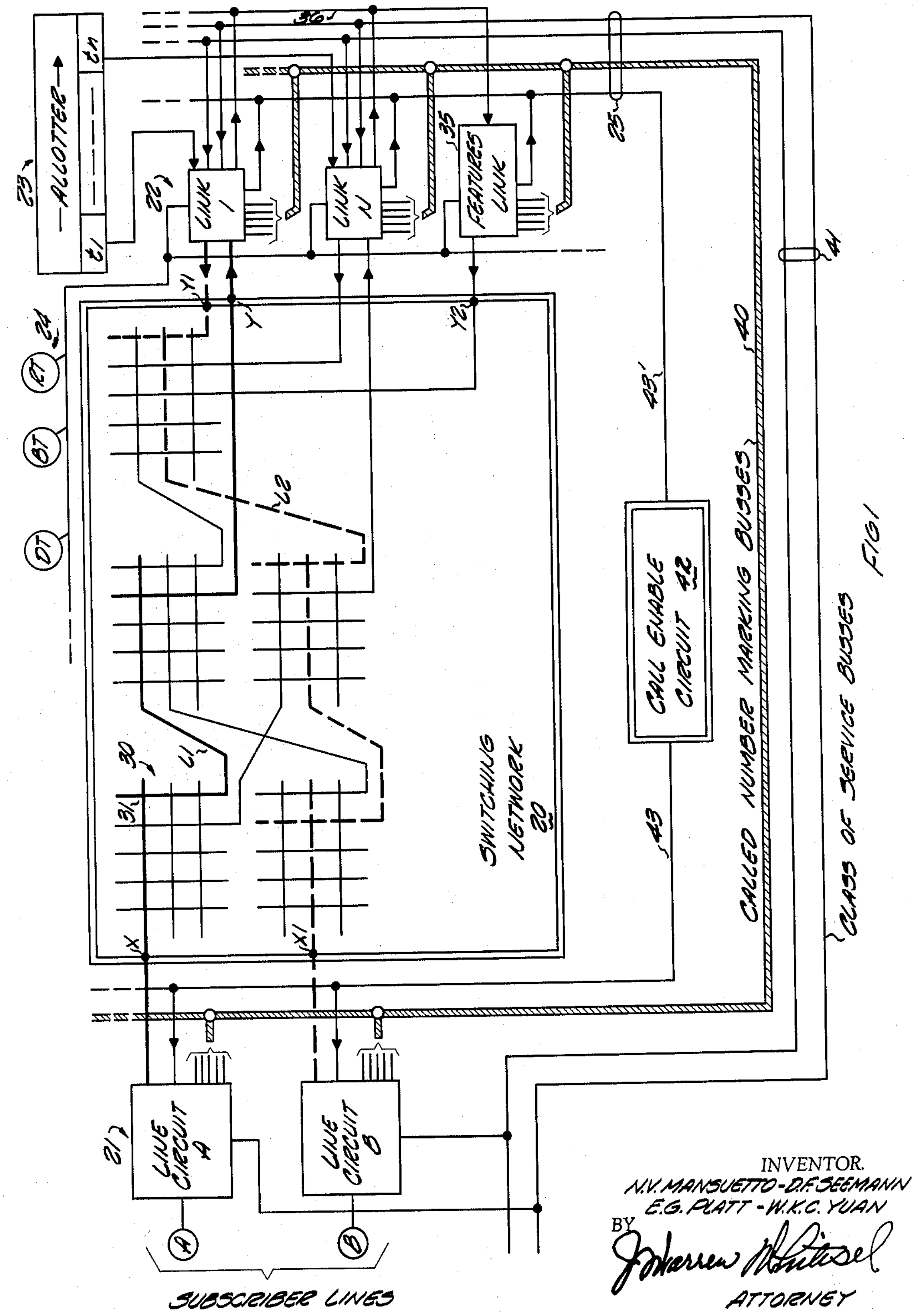
Figure 2:
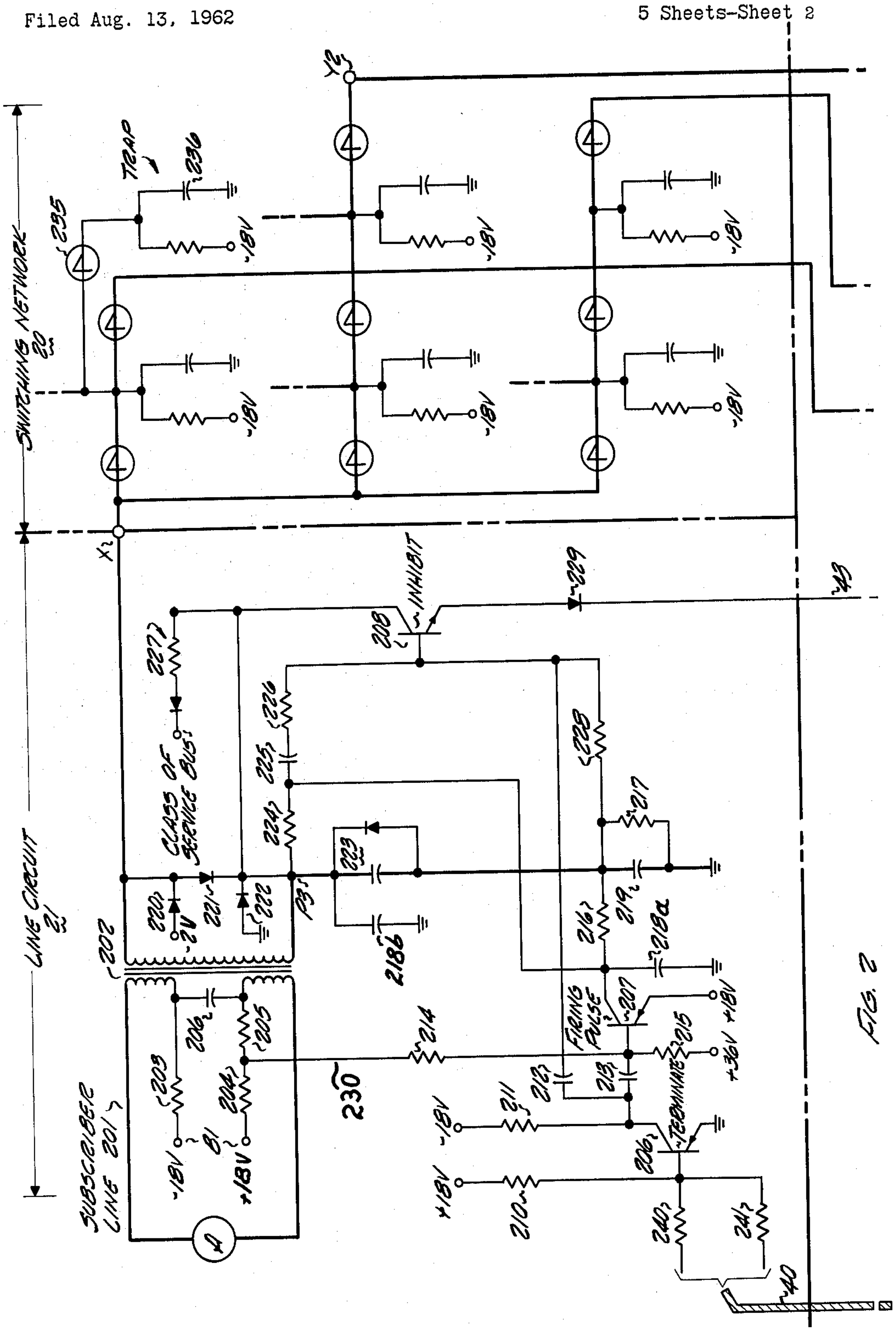
Figure 3:
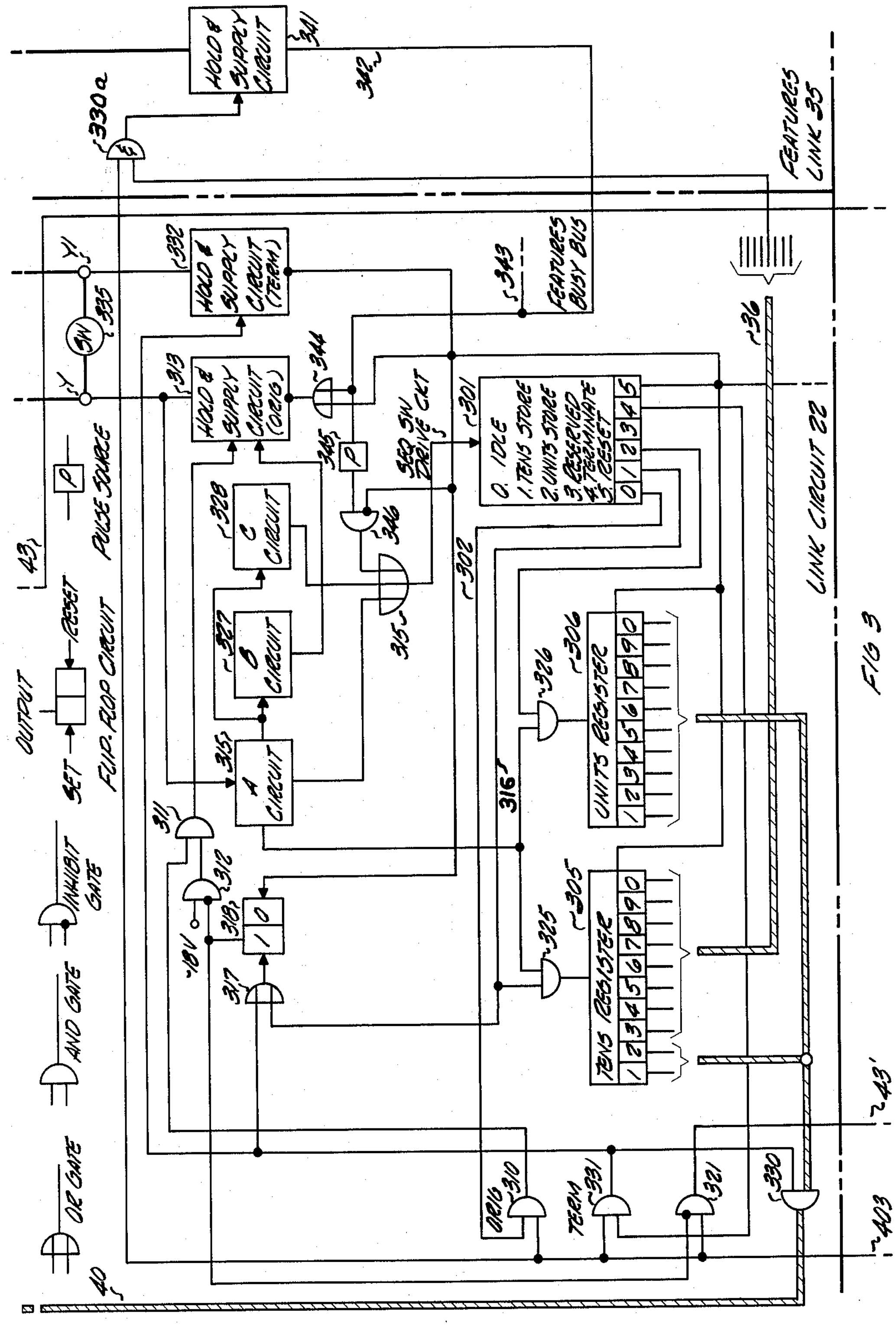
Figure 4:
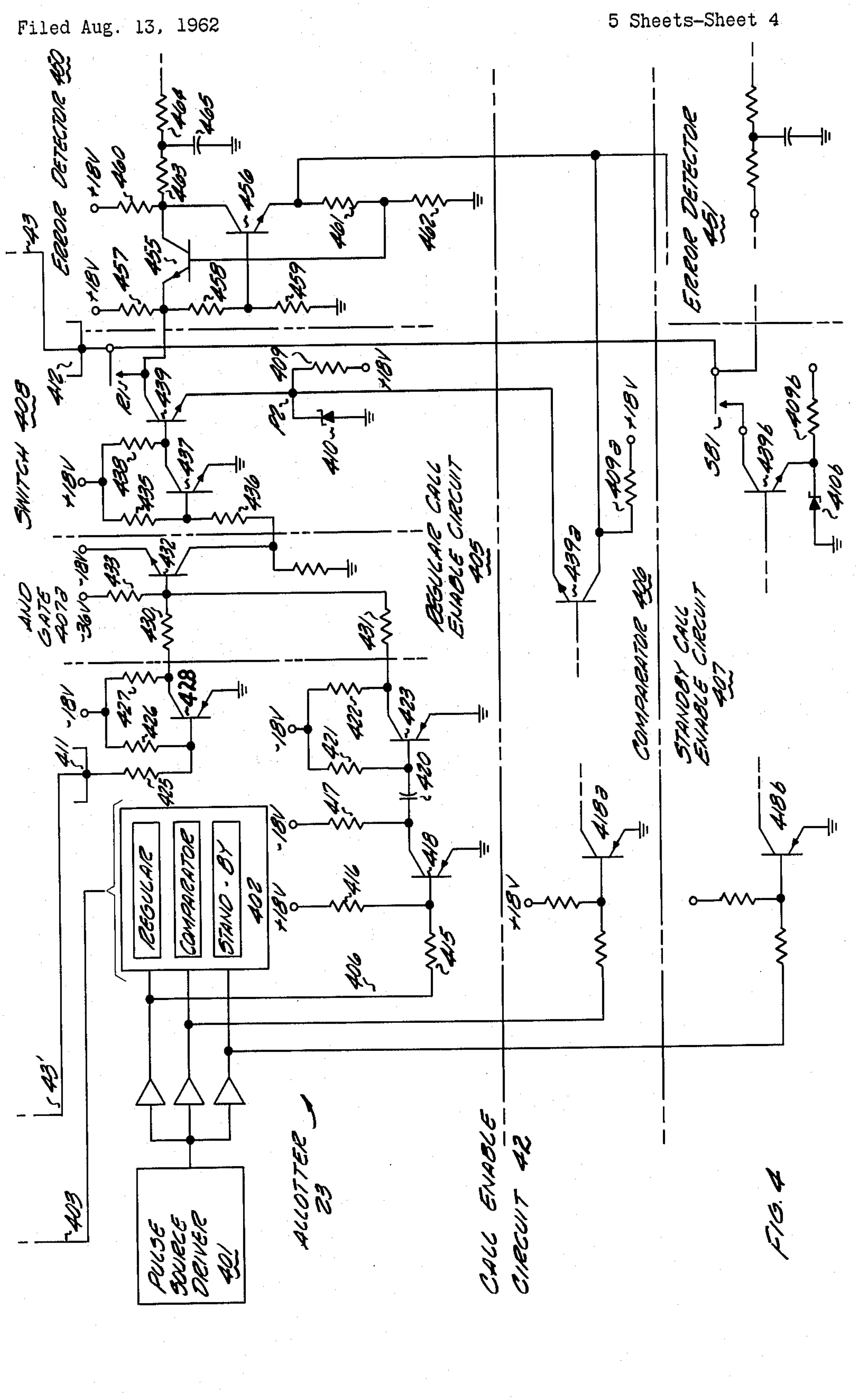
Figures 5, 6:
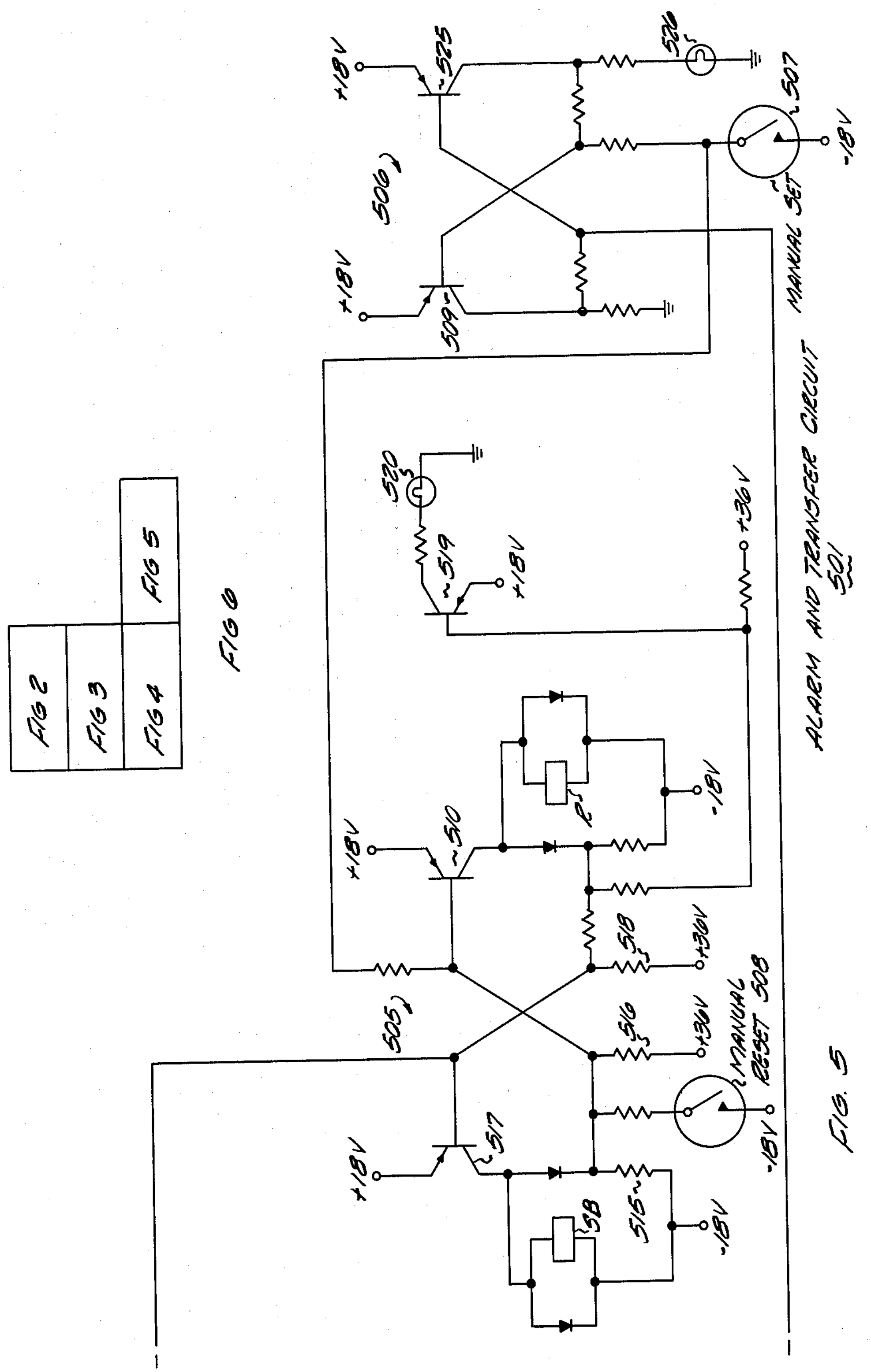

The details of the circuitry required to complete the FIG. 1 system are shown in FIGS. 2–5. More particularly, a line circuit 21 and the network 20 are shown in FIG. 2. A general purpose link circuit 22 and a features link circuit 35 are shown in FIG. 3. The call enable circuit is shown in FIG. 4 and an alarm and transfer circuit are shown in FIG. 5.

*Common equipment*

*Allotter.*—The idle link circuits are assigned to serve the next call by the allotter 23 (FIG. 4). Reference may be made to the above identified Yuan application for a detailed disclosure of the allotter. In general, it includes a common pulse source driver 401 and three synchronously driven ring counters 402. As long as all three ring counters step in unison, the allotter output is taken from the *Regular* counter. Any loss of unison between the *Regular* and *Comparator* counters transfers the allotter output to the *Stand by* counter. In any event, the allotter output is a cyclically recurring series of pulses which define time frames that individually identify and enable the links. Thus, the conductor 403 is marked by the same pulse in every recurring series of allotter output pulses; or, stated another way, during each time frame which identifies the link of FIG. 3.

The link functions are controlled by a sequencing switch 301, which may also be a ring counter. This counter has a number of positions which correspond to link functions. For example, all idle links rest on the "0" step to energize a "start" conductor 302. On step "1," the link stores a first digit in a ring counter 305; or causes digit discrimination through dropback selector operation. On step "2," the link stores a second digit in a ring counter 306. Step "3" is not described herein; it could provide for a third digit store; it could also provide special supervision required by some associated equipment. Step "4" allows a call to terminate to a called line, and step "5" causes the sequence switch to reset. An advantage of this arrangement is that the same ring counter design may be used in six different places (i.e. in allotter 402, sequence switch 301, and registers 305, 306). This affords on opportunity for cost reduction.

In any event, an idle link is characterized by one potential (or ground) and a busy link by another (or ground) on conductor 302. When this idle link potential or marking on conductor 302 coincides with the allotter output or link identifying time frame marking on conductor 403, an originate AND gate 310 conducts. At the input of AND gate 311, the output of AND gate 310 coincides with a −18 v. marking from an inhibit gate 312. The AND gate 311 conducts and pulses an originate control circuit 313. The circuit 313 end-marks its link side, point of access Y in the switching network 20.

If no path fires through network 20 before termination of a link allot time frame, the end-marking is removed from point Y. That is, the pulse source driver 401 is free-running—600 c.p.s. in one system. Thus, allotter 402 takes six hundred steps per second. Therefore, the link of FIG. 3 is allotted only during a time period of one-six hundredth of a second or about 1.6 milliseconds. Then some other link is allotted via another conductor similar to conductor 403. When the allotter steps off conductor 403, AND gate 310 ceases to conduct. The AND gate 311 ceases to conduct, and the originate circuit 313 removes its end-marking from the point Y.

Next, assume that a path does fire through the network 20 to point Y while the FIG. 3 link is allotted. The voltage at point Y changes at the instant when the path is completed. This change is detected by an "A" circuit 315. (The letters "A," "B," "C" merely indicates the order in which the circuits respond. Probably, this notation is suggested from the well known A, B, and C—or line, hold, and series—relays of step-by-step circuits which perform the same functions.) The output of the A circuit feeds through an OR circuit 315 to step the sequence counter 301 to step 1. There, an output voltage feeds over a conductor 316 and through an OR gate 317 to trip a busy indicating flip-flop circuit 318 which energizes its "1" side. This busy flip-flop output inhibits the gate 312 to remove the −18 v. marking from the lower input of AND gate 311. The result is that AND gate 311 ceases to conduct, and originate circuit 313 removes the end-marking potential from point Y. Circuit 313 continues to supply holding current until inhibited or as long as the path is completed through network 20.

After a path is completed, no future link allot pulses on conductor 403 can have any effect on circuit 313 because gate 312 is inhibited from flip-flop 318.

*Call enable circuit.*—The next circuit to be described is the call enable circuit 42 of FIG. 4 and its associated alarm and transfer circuit 501 of FIG. 5. The purpose of circuit 42 is to energize the call enable bus 43 at all times except when a call may be extended through the network. The purpose of circuit 501 is to transfer to a stand by call enable circuit if a regular call enable circuit fails. This is a fail safe feature which prevents a catastrophic failure during which no calls can be originated.

The call enable circuit 42 comprises three identical circuits or channels, here designated: Regular Call Enable Circuit 405, Comparator 406, and Stand-by Call Enable Circuit 407. All three circuits or channels are identical; therefore, only the circuit or channel 405 is shown in detail.

Generally speaking, channel 405 has two inputs 406 and 43′ feeding into an AND gate 407*a*. A coincidence of an idle link signal on conductor 43′ and an allot pulse on conductor 406 operates the call enable channel 405. When the AND gate 407*a* conducts an electronic switch 408 turns "off" to de-energize the call enable bus 43. At all other times, the bus 43 is energized from point P2 on the voltage divider 409, 410. The Zener diode 410 regulates the potential taken from voltage divider.

The symbol 411 indicates a common tie point to which all links attach, and the symbol 412 indicates a common tie point to which all line circuits attach.

The remaining components in the regular call enable circuit 405 are as follows:

Resistor 415—current limiting;
Resistor 416—base bias for transistor 418;
Resistor 417—collector load for transistor 418;
Transistor 418 (normally off)—a circuit for producing square waves from the voltage of Source 401;
Capacitor 420—controls the width of the square pulse;
Resistor 421—base bias for transistor 423;
Resistor 422—collector load for transistor 423;
Transistor 423 (normally on)—phase inverter;
Resistor 425—current limiting;
Resistor 426—base bias for transistor 428;
Resistor 427—collector load for transistor 428;
Transistor 428 (normally on)—impedance matching, phase inverting, loading, and isolating;
Resistors 430, 431 and transistor 432 (normally on)—AND gate;
Resistor 433—base bias for transistor 432;
Resistor 435—base bias for transistor 437;
Resistor 436—current limiting;
Transistor 437 (normally off)—phase inversion;
Resistor 438—collector load for transistor 437;
Transistor 439 (normally on)—electronic switch;
Contacts R1 (normally closed)—assigns regular call enable circuit 405.

The components 418*a*, 439*a* in comparator channel 406 and 418*b*, 439*b* in the Stand-by channel 407 are identical to the components 418 and 439 of the regular channel 405, as are all components (not shown) which interconnect the components 418*a*, 439*a* and 418*b*, 439*b*.

The call enabling circuit operates in the following manner. The pulse drive source 41 generates cyclically recurring pulses that define time frames during which links are allotted to control the extension of calls. Simultaneously, conductor 406 is energized to indicate that a connection may be extended through the network 20 if a link is idle. Transistor 418 switches "on" for the duration of the link identifying time frame pulse from source 401. Normally "on" transistor 423 switches "off" to remove one source of ground from the base of normally "on" transistor 432.

If the link is idle, conductor 43′ is at a potential which makes the base of transistor 428 positive, with respect to the emitter. If the link is busy, the base is negative. This is because the inhibit gate 321 conducts during time frames which identify link 22 if the link busy flip-flop 318 stands on its "0" side. Thus, if the link is idle, normally "on" transistor 428 switches "off"; otherwise it remains "on." The "1" side output of the busy flip-flop 318 inhibits the output of the inhibit gate 321.

If there is a coincidence of an idle link and a link identifying time frame, both of the transistors 423, 428 are "off." The base of normally "on" transistor 432 goes negative with respect to its emitter, and it switches "off." The base of transistor 437 then goes positive relative to its emitter, and it switches "on." The emitter ground of transistor 437 appears at the base of the electronic switch transistor 439 which switches "off." This de-energizes the call enable bus 43 and removes a clamping potential (at point P2) from a point in every line circuit. This clamping potential prevents any change of end-marking potential on the line side of the network 20. Removal of the clamping potential allows an end-marking to be applied to the line-side of the network if an unanswered calling condition exists.

Next, assume that the allotter allots a busy link. The conductor 406 is made negative from the source 401 to indicate an occurrence of a link allotting time frame. However, the link is busy, and inhibit gate 321 can not conduct; therefore, transistor 428 stays "on." The emitter ground from transistor 428 remains on the base of transistor 432 which also stays "on." Transistor 437 does not switch "on" and transistor 439 does not switch "off." Thus, the clamping potential of point P2 on voltage divider 409, 410 remains on conductor 43 and the end-marking point of access in every line circuit remains clamped at the P2 potential. Hence no line circuit can apply any end-marking to the network.

Next, consider what happens when a path fires through the network 20 to the idle link. First, the potential difference between points X and Y drops substantially and no other line circuit can fire to point Y. Second, A circuit 315 responds to this drop in potential at point Y and drives sequence switch 301 to its step "1." Then, the link busy flip-flop 318 switches to its "1" side and, despite the continued presence of the link 22 time frame, the inhibit gate 321 ceases conducting. Thus, transistor 428 switches "on," and it is as if link 22 were originally busy. As explained in the next preceding paragraph, the end-marking in every line circuit is clamped to the potential at point P2. Thus, all of the end-markings are removed from the line side of the network 20.

*Alarm and transfer.*—Upon reflection, it is apparent than any failure of the call enable circuit would amount to a failure of the entire system. This can not be allowed to happen. Therefore, three identical channels 405–407 are driven in synchronism from the same common pulse source 401. If all three channels function simultaneously, probably no failure has occurred. On the other hand, if synchronism is lost a failure may have occurred. Therefore, the invention contemplates a continuous comparison between the outputs of channels 405, 407 and comparator channel 406. Normally, contacts R1 are closed and SB1 are open so that the regular channel 405 is used, but if loss of synchronism occurs, contacts R1 open and SB1 close so that the stand-by channel 407 is used.

The principal divisions of the alarm and transfer circuit are two flip-flop circuits 505, 506 and two identical error detectors 450, 451.

The operation and construction of the flip-flop circuits 505, 506 will be apparent to those skilled in the art. Therefore, no effort will be made herein to describe them in great detail. Instead, the description will move directly to the error detecting circuits 450, 451.

Consider the error detector 450, by way of example. It includes a two input AND gate comprised of two normally "off" electronic switches, i.e. NPN transistors 455, 456. The other components in the error detector circuit are:

Resistor 457—collector load for transistor 439;
Resistor 458—current limiting;
Resistor 459—base bias for transistor 456;
Resistor 460—collector load for transistors 455, 456;
Resistor 461—current limiting;
Resistor 462—base bias for transistor 455;
Resistors 463 and 464—current limiting;
Capacitor 465—damps spikes and allows for slight time differences between channel output pulses.

The error detector circuit operates this way. Normally, the emitters of both transistors 455, 456 are energized from point P2 simultaneously when the transistors **439, 439*a* are "on" and de-energized simultaneously when the transistors 439, 439*a* are "off." The circuit values are such that the base electrodes of these transistors have an "on" bias when the emitters have an "off" bias, and vice versa. Thus, neither of the transistors 455, 456 switches "on" as long as synchronism remains. If an error occurs, synchronism is lost and transistors 439, 439*a* do not switch "on" and "off" at the same time. Assume, for example, that transistor 439 is "on" while transistor 439*a* is "off" and that the potential at point P2 is about +6 volts. The emitter of transistor 455 stands at +6 volts. The base is biased by a voltage divider extending from +18 volts through resistors 409*a*, 461, and 462 to ground. Thus, the emitter of transistor 455 is negative with respect to its base; it switches "on." When the situation reverses, transistor 439*a* is "on" while transistor 439 is "off." Transistor 455 switches "off" and transistor 456 switches "on." Either way, the potential at the junction of resistors 460, 463 goes negative relative to the +18 volts connected to resistor 460**.

In a similar manner, any loss of synchronism between channels 406, 407 causes the error detector 451 to switch "on."

When the system is first placed in operation, the nonlocking MANUAL SET and RESET keys 507, 508 are pushed. As those familiar with flip-flop circuits know, transistors 509, 510 switch "on." Current flows through the winding of regular relay R. Thus contacts R1 close to connect the call enable bus 43 to the "Regular Call Enable Circuit" 405.

Once transistor 510 switches "on," it remains "on" because its base is made negative by current flow in the voltage divider including the resistors 515, 516. Transistor 517 derives base bias from the voltage divider including resistors 460, 463, 464, and 518. Since current does not normally flow in this voltage divider, the base of transistor 517 is positive with respect to its emitter, and transistor 517 if "off."

When an error occurs in the "Regular Call Enable Circuit" 405, the voltage at the junction of resistors 450, 463 moves in a negative direction and transistor 517 switches "on." In keeping with the usual flip-flop operation, transistor 510 switches "off." Thus, regular relay R releases and stand-by relay SB operates. This opens contacts R1 and closes contacts SB1 (FIG. 4) thereby transferring the call enabling bus 43 from the regular to the stand-by circuit.

A minor alarm is given upon transfer. That is, when the voltage at the junction of resistors 460, 463 goes negative to switch "on" transistor 517, the base of transistor 519 also goes negative, and it switches "on." This lights an alarm lamp 520 (or gives any other suitable alarm).

A major alarm is given if the stand-by circuit develops trouble. That is, the output of error detector 451 goes negative, and the transistor 525 switches "on." This lights lamp 526 to give a major emergency alarm. Normally, this will never occur because maintenance will be performed when the minor alarm light 520 goes on.

*Extension of a call*

Next to be described is the manner in which a call is extended through the system.

*Call originate condition.*—The line circuit is shown in the left-hand side of FIG. 2. This circuit includes a subscriber station A and line 201, transformer coupled at 202 to the line side, point of access X in the network 20. The talking battery B1 is supplied to the line via current limit resistors 203–205 and the primary windings of transformer 202. Capacitor 206 provides an A.C. bypass.

The line circuit also includes three normally "off" electronic switches 206–208 which may be junction type transistors, for example. Switch 206 is part of the AND gate uniquely connected to the called number busses 40. This switch turns "on" when the cable 40 busses uniquely connected to its base electrode are energized. Switch 207 generates a firing pulse which is the end-marking applied to the line side point of access X in the network 20. The switch 208 selectively inhibits the effects of this pulse under control of the call enable circuit 42.

The line circuit components remaining to be described are as follows:

Resistor 210—base bias for transistor 206;
Resistor 211—collector load for transistor 206;
Capacitor 212—coupling path for terminate pulse to inhibit the application of common bus clamping potentials;
Capacitor 213—coupling path for terminate pulse to provide for generation of firing pulses;
Resistor 214—provides path for "off hook" control potential;
Resistor 215—base bias for transistor 207;
Resistors 216 and 217—current limiting;
Capacitor **218*a***—slows rise time of originate firing pulse;
Capacitor **218*b***—slows rise time of terminate firing pulse;
Capacitor 219—A.C. short circuit for speech signals;
Diode 220—clips dial pulses;
Diode 221—clips "off hook" spikes;
Diode 222—provides holding current to the network 20 during the self-seeking search;
Network 223—provides part of the talking battery path through the network, aids during firing, and controls in-network wave shape;

Resistor 224—current limiting and voltage dropping;

Capacitor 225—provides a coupling path during originate pulse to turn "on" transistor 208;

Resistor 226—current limiting;

Network 227—class of service indicating components;

Resistor 228—base bias for transitor 208;

Diode 229—isolation.

The line circuit operates this way. Normally, all line circuit transistors are "off." Subscriber station A goes off-hook and completes a loop across battery B1. The voltage on conductor 230 jumps, and the base of PNP transistor 207 goes negative relative to the emitter. Transistor 207 switches "on." The +18 volts on the transistor 207 emitter appear at the collector; capacitor 225 charges to switch on transistor 208 which draws base current through resistor 228. The resulting voltage change holds the transistor 208 "on." The positive emitter potential of transistor 207 also feeds through the resistor 216 and diode 223, but the voltage at point P3 does not change because transistor 208 is "on" and point P3 is clamped to the voltage of point P2 which is on common call enable bus 43.

Means are provided in all line circuits having an unanswered calling condition for applying an end-marking potential to the line side point of access X in the network 20, thus providing for random call origination. More particularly, the call enable circuit (FIG. 4) removes the potential from conductor 43 when the allotter 402 assigns an idle link. This removes the clamping potential from the point P3. Since the transistor 207 is "on," the voltage at point P3 moves positively toward +18 volts. The capacitor 218*a* slows the rising edge of the wave form of this positive going voltage. As the point P3 goes positive, the end-marking voltage at point X also goes positive, and a self-seeking path fires through the network 20.

While the path is being completed, (i.e. during the self-seeking search) a holding current flows through diode 222 to hold fired diodes. Also, while the path fires through the network certain unwanted wave forms could occur if a subscriber should hang-up. The capacitor of network 223 prevents these unwanted wave forms by "taming" the spike which occurs when the hook switch contacts open.

If the path does not find its way through the network 20 to the end-marked, link side point Y, diode 235 fires and the path terminates in a trap circuit for the period of time required to charge capacitor 236. This trap circuit is explained in the above identified Haskins, Platt, and Dunlap application.

If the path does not reach an idle link before the call enable circuit re-energizes bus 43, the point P3 is again clamped to the potential of point P2 and the charge on capacitor 218*a* returns to normal. Assuming that station R remains "off" hook, another firing pulse appears at point X when the call enable circuit next de-energizes the bus 43.

When the path is finally completed to a link, current flows from the voltage divider including +18 volts, transistor 207, and resistors 216, 217 to ground. The potential applied through resistor 228 to the base of transistor 208 changes in a manner such that transistor 208 is back biased when conductor 43 is re-energized from the call enable circuit 42. Thus, transistor 208 remains "off" for the duration of the call.

*Dialing.*—When the sequence switch 301 reaches step "1," dial tone is returned to subscriber A in any well known manner. The allotter 402 continues stepping and assigning other links. It may also assign link 22 many times. However, gate 321 is inhibited from busy flip-flop 318 and there is no effect. A timer (not shown) may drop the connection if dial pulses are not received promptly.

A standard telephone dial is provided at station A. Thus, each dial pulse opens and closes the loop of line 201 a number of times which depends upon the finger hole used during dialing. On each dial pulse, transistor 207 switches "off" then "on." This changes the potential at point P3, but does not release the switch path because a holding current flows through diode 222.

When dial pulses are received in the link, the "A" circuit 315 pulses AND gates 325, 326 and the "B" circuit 327 once for every pulse. The "B" circuit holds "on," due to its slow release characteristics to prevent the dial pulses from releasing the link. The pulses transmitted to AND gate 325 coincide with the step "1" output of the sequence switch 301. This drives the tens register 305 one step per pulse to store the numerical value of the first digit.

For the purposes of this description only, it is assumed that the "tens" digits "1, 2" identify subscriber lines and that the "tens" digits "3–0" identify features. For example, "3" may indicate a trunk call, "4" a conference call, "5" central dictation, "6" public address, etc. Obviously, hundreds and thousands registers could also be provided, and features could be identified by two, three, or four digit numbers. Here we will assume that the first "tens" digit is "1" and indicates a call to a subscriber line.

During each dial pulse the "A" circuit 315 also pulses "C" circuit 328. A predetermined time after the last pulse in the "tens" digit pulse train, "C" circuit 328 times out and drives the sequence switch one step (the drive circuit being completed via OR gate 315). The sequence switch steps off of step "1" to remove the potential from the left-hand input of AND gate 325 and to remove dial tone (not shown). On step "2," the sequence switch energizes the right hand input of AND circuit 326.

The subscriber dials the second digit. The "A" circuit 315 pulses AND gate 326 to drive the units register 306, the "B" circuit 327 to prevent link release, and the "C" circuit 328 to detect the end of a pulse train. After the end of the units digit pulse train, the "C" circuit times out and drives the sequence counter 301. On step "3," any desired function can be completed. If no function is necessary, step "3" is wired to drive the sequence switch to step "4."

*Call terminate condition.*—The circuit is now ready to terminate a call to the called party. The identification of the called party is stored in the "tens" and "units" registers 305, 306. The register outputs are fed into a series of twenty AND gates collectively shown at 330, and at 330*a*.

From the start of the call originate condition until the time when the sequence switch 301 reaches step "4," the link 22 may have been allotted many times without effect. Now, however, the next link allot pulse from allotter 402 coincides at terminate AND gate 331 with the step "4" output from sequence switch 301. Thus, AND gate 331 conducts to indicate a ready to complete a connection condition.

Responsive to the output of AND gate 331, the link busy flip-flop 318 is pulsed through OR gate 317 to be certain that the link busy marking appears on the "1" side. Normally, there is no effect because this "1" side link busy marking is already present. The AND gate 331 pulses hold and supply circuit 332 and AND gates 330 simultaneously. Circuit 332 applies an end-marking to the link side, point of acess Y1 of the network 20. Two of the AND gates 330 conduct depending upon the digits stored in registers 305, 306. This marks two conductors in cable 40. In the called line circuit, and only in the called line circuit, there is a response.

Means are provided for completing or terminating calls on a one-at-a-time basis. This is done through the use of line circuit equipment which overrides the inhibiting potentials on the call enable bus. In greater detail, assume that the two cable 40 conductors marked from the "tens" and "units" registers through AND gates 330 connect to the resistors 240, 241 in FIG. 2. The base of transistor 206 goes negative, it switches "on," and capacitors 212, 213 conduct until charged. During this charging period, while capacitors 212, 213, conduct in the called line circuit, the transistor 207 switches "on" to generate a firing pulse and the transistor 208 switches "off" to inhibit the effects of the busy potential on the call enable bus 43. This means that the called line circuit generates a firing pulse which marks the line side point of access X in the network 20.

No other line may originate a call at this time because the link assigned by the allotter is busy. In greater detail, the called line circuit will generate a terminate pulse only when its AND gate resistors 240, 241 are marked from AND gates 330. These AND gates conduct only when their upper inputs are energized from terminate gate 331. It, in turn, conducts only during the time frame while the allotter 402 enables the link 22. During this time frame, the gate 321 is inhibited from the busy flip-flop 318 which stands on its "1" side. Thus, the enable circuit electronic switch 439 does not switch "off"; call enable bus 43 remains energized at the point P2 potential; point P3 in every line circuit (except the called line circuit) is clamped to the potential of point P2.

The gate 335 switches through and the subscribers may converse.

*Release*.—After the conversation is completed, the subscribers hang up. The hook-switch contacts break the line loop at the subsets, thus causing the transistor 207 to switch "off." The voltage at point P3 changes. The "A" circuit 315 detects the change and pulses the "B" and "C" circuits 327, 328 which measure a time period that is longer than standard dial pulses. After such period, the "C" circuit drives the sequence switch 301 to step "5." On step "5," the sequence counter resets the registers 305, 306. It also inhibits holding circuits 313, 332, and resets the busy flip-flop 318 to its "0" or idle side. The switch paths in network 20 release when circuits 313 and 332 are inhibited.

After all circuits are normal, the sequence switch 301 is stepped to its "0" or idle position. The link is now ready to serve another call.

*Features call*

Next, assume that the tens digit did not identify a call to a subscriber line, but identified a specific feature. The "tens" register 305 marks a particular conductor in cable 36 to identify the desired feature. For example, the "tens" number could indicate a code call, which we assume is provided by the features link 35.

The marking on cable 36 energizes the lower input of AND gate 330*a*. When the allotter 402 next allots link 22, AND gate 330*a* conducts to pulse a hold and supply circuit 341 in the features link.

If the features link is busy, it does not energize conductor 342 and equipment (not shown) attached to conductor 343 returns busy tone to the calling subscriber.

*Drop link*.—Means are provided for dropping (or releasing) the general purpose link 22 and completing the connection under the control of the special purpose features link 35. More particularly, if the features link is idle, the circuit 341 responds to the output of AND gate 330*a* by end-marking the point Y2 and by energizing the conductor 342. Equipment tied to conductor 343 inhibits the transmission of busy tone. The OR gate 344 conducts to inhibit circuit 313 and release the path from point X through the network to point Y. The potential on conductor 342 also energizes a pulse source 345 to drive the sequence switch 301 to step "5." On step "5," inhibit gate 346 is inhibited to stop the sequence switch drive. Thereafter, link 22 releases in a normal manner.

When the circuit 313 drops the path from the link 22 through the network 20 to the line circuit 21, the voltage at point P3 starts to change toward the +18 volts on the emitter of transistor 207. However, the capacitor 218*b* slows the rise time of the voltage change, thus providing a slow rising, end-marking voltage at point X. A path now fires from point X to the point Y2, thus connecting line A to the features link 35.

No other line circuit can fire to features link 35. Recall that link 22 was busy at the start of its time frame. Thus, the call enable bus 43 is energized to prevent the origination of any other call. Before the link busy marking is removed, sequence switch 301 must step to step "5" and flip-flop 318 must switch "off." By that time, the link allot time frame will have terminated.

The potential on the call enable bus 43 does not prevent line circuit 21 from firing to the features link 35. More particularly, when the path originally fired from line 21 to link 22, inhibit transistor 208 switched "off," and capacitor 219 charged. When the switch path to link 22 drops out, the capacitor 219 begins to discharge, but the discharge time is such that the transistor 208 remains back-biased for a period of time that is adequate to fire the path from point X to point Y2 and into the features link 35. As long as transistor 208 is "off," the potential on the call enable bus 43 can have no effect.

No effort will be made to list all the advantages of the invention. However, it may be well to cite a few, by way of example. One advantage is that the invention accomplishes the highly desired random call origination without sacrificing the one-at-a-time termination. Moreover, this is accomplished through use of a single, very simple, call enable circuit, as distinguished from a complex system scanner or master control. This way redundancy and comparison, with alarm and transfer may be built into the call enable circuit without greatly adding to the system expense. Another advantage is that unguarded intervals are precluded by a positive interlock between the line circuits ability to apply a firing pulse and the link circuits ability to terminate a switch path. Thus, time sharing techniques may be safely used to assign links. Yet another advantage results from the ability of a general purpose link to transfer a call to a special purpose link at any time during a call. Moreover, this transfer does not require any substantial amount of added line circuit equipment. Quite obviously, other advantages could be selected to illustrate the value of the invention.

While the principles of the invention have been described above in connection with specific apparatus and applications, it is to be understood that this description is made only by way of example and not as a limitation on the scope of the invention.

We claim:

1. An electronic switching telephone system comprising a current controlled, self-seeking switching network, a plurality of telephone subscriber lines connected to one side of the network and a plurality of connection controlling circuits connected to the other side of the network, means operative on a time sharing basis for assigning said connection controlling circuits to control the extension of switch paths through said network on a call function basis, and means responsive to a condition requiring a connection between a called line and one of said connection controlling circuits for enabling the extension of one of said switch paths and inhibiting the extension of all other of said switch paths.

2. The system of claim 1 wherein said enabling means comprises a bus common to all said line circuits and said connection controlling circuits, means for marking said common bus when switch paths cannot be extended through said network, means responsive to said connection requiring condition for selectively causing one of said line circuits to override said marking said common bus, and means associated with all other of said line circuits for inhibiting the extension of said switch paths responsive to said marking on said bus.

3. The system of claim 1 wherein each of said subscriber lines is connected to in an individually associated line circuit, said enabling means comprising a common bus extending between all of said line circuits and all of said connection controlling circuits, said means in each of said connection controlling circuits for controlling potentials applied to said bus for preventing seizure of a busy control circuit, enabling means comprising means associated with a called one of said line circuits for causing that line circuit to extend a switch path to a busy control circuit despite a marking selectively applied to said bus from said busy control circuit, and means associated with all other of said line circuits and response to said selective marking for precluding the extension of a switch path.

4. The system of claim 1 wherein said enabling means comprises a bus common to all said line circuits and said connection controlling circuits, an electronic switch for selectively applying potentials to said common bus, a two input AND gate for controlling said electronic switch, means for energizing one input of said AND gate during periods when a connection may be extended from said lines through said network to a connection controlling circuit, means for energizing the other input of said AND gate during periods when an assigned connection controlling circuit is idle, and means responsive to the output of said AND gate for selectively causing said electronic switch to apply either a call inhibiting or a call enabling potential to said common bus.

5. The system of claim 4 wherein each of said line circuits includes three electronic circuits, one of said circuits providing means for identifying individual lines in said system, a second of said circuits comprising means responsive to connection request conditions from an associated line circuit for applying an end-marking potential to a line side point of access in said network, and the third of said circuits comprising means for selectively applying the inhibiting potential on said bus as a clamping potential to the line side point of access in said network during times when paths can not be extended from said point through said network.

6. The system of claim 5 wherein said third circuit is interposed between said common bus and the line side point of access associated with the line circuit including said third circuit, and means responsive to said second circuit for switching "on" said third circuit to apply any potentials on said common bus to said line side point of access.

7. The system of claim 6 and means responsive to said first circuit for holding "off" said third circuit to prevent any potentials on said common bus from reaching the line side point of access associated with the line circuit including said third circuit.

8. An electronic switching system comprising a current controlled, self-seeking switching network, a plurality of telephone subscriber line circuits connected to one side of the network and a plurality of connection controlling link circuits connected to the other side of the network, a bus common to all said line circuits and said link circuits, means responsive to a calling condition in any of said line circuits for extending a connection from each of said calling line circuits through said network toward a link circuit, means responsive to the completion of a first one of said connections to an idle link for marking said bus to inhibit other of said connections, means responsive to a condition requiring a connection between a called line and said connected link circuit for selectively marking one of said line circuits, and means responsive to said marking in said one line circuit for overriding said marking on said bus and extending a connection through said network to said connected link circuit, all other line circuits being then inhibited by said common bus marking from extending such a connection through said network.

9. The system of claim 8 wherein said common bus is selectively marked by a call enabling circuit comprising a two input AND gate and an electronic switch, means for energizing one input of said AND gate during periods when a connection may be extended through said network, means for energizing the other input of said AND gate during periods when an assigned link is idle, means controlled by said AND gate for selectively operating said electronic switch to apply either a call enabling potential or said call inhibiting marking to said common bus and said means responsive to said extension of said first connection comprising means for energizing said other input of said AND gate.

10. The system of claim 9 and means for continuously comparing voltages on said common bus with a source of standard voltages, and means for transferring to a stand-by circuit for energizing said bus if said comparing means detects a variance between said voltage on said bus and said standard voltage.

11. The system of claim 8 and a line circuit having three electronic switches, one of said switches being controlled from said link circuits to provide said means for selectively marking individual lines in said systems, a second of said switches comprising means responsive to connection request conditions from an associated line circuit for applying an end-marking potential to a line side point of access in said network, and the third of said switches comprising means for selectively applying the marking potential on said bus as a clamping potential to said line side point of access, whereby the end-marking potential applied by said second switch can not change during times when paths can not be extended through said network.

12. The system of claim 11 wherein said third switch is interposed between said common bus and the line side point of access associated with the line circuit including said third switch, and means responsive to said second switch for switching "on" said third switch to apply any potentials on said common bus to said line side point of access during times when a connection request condition exists and paths can be extended through said network.

13. The system of claim 12 and means responsive to said first switch for holding "off" said third switch to prevent any potentials on said common bus from reaching said line side point of access to provide said overriding condition.

14. An electronic telephone system comprising a plurality of telephone subscriber lines and a plurality of connection controlling circuits, a switching network, means associated with said lines for extending connections through said network to one of said connection controlling circuits, means associated with said one connection control circuit for receiving and storing an indication of a called line, a bus common to all said lines and said connection controlling circuits, means responsive to said stored indication of said called line for selectively marking said common bus, means operative on a time sharing basis for assigning said connection controlling circuits to extend said connections through said network on a call function basis, and means responsive to said marking on said common bus for enabling the extension of a connection from said called line through said network to said one connection controlling circuit and for inhibiting all other line circuits from extending such connections.

15. An electronic telephone system comprising a current controlled, self-seeking switching network, a plurality of telephone subscriber line circuits connected to one side of the network and a plurality of connection controlling circuits connected to the other side of the network, some of said connection controlling circuits comprising a first type circuit having general purpose capability for controlling the extension of calls and other of said connection controlling circuits having a second type circuit including special purpose means for completing specific call features, means responsive to a calling condition in one of said subscriber line circuits for extending a first connection from said calling line circuit through said network to a first connection controlling circuit having said first type circuit, means in said first circuit selectively responsive to particular signals received from the calling line for causing the extension of a second connection from said calling line circuit through said network to a second connection controlling circuit having said second type circuit and including the special purpose means required to provide the call feature indicated by said particular signal, and means for releasing said first connection and serving the call responsive to controls from said second connection controlling circuit.

16. An electronic switching telephone system comprising a switching network for extending connections from subscriber line circuits to link circuits, some of said link circuits comprising general purpose means for controlling the extension of calls and other of said link circuits comprising special purpose means for providing specific call features, means responsive to the initiation of a call for extending a first connection through said network to a first link circuit, means in said first link circuit selectively responsive to particular signals occurring during said call for causing the extension of a second connection through said network to one of said other link circuits, means for releasing said first connection and said first link circuit, and means for serving said call responsive to controls from said other link circuit.

17. The system of claim 16 wherein each of said line circuits includes three electronic switches, one of said switches providing means for identifying individual lines in said systems, a second of said switches comprising means responsive to connection request conditions from an associated line for applying an end-marking potential to a line side point of access in said network, and said third switch comprising means for selectively applying a clamping potential to said line side point of access during times when paths can not be extended through said network.

18. The system of claim 17 and means responsive to the extension of said first connection for operating said third switch to an "off" condition for preventing said application of said clamping potential to said network, and means responsive to said particular signals for dropping said first connection while holding said second switch "on" and said third switch "off" to apply an end-marking potential on said line side point of access and prevent said clamping potential from reaching said line side point of access .

19. The system of claim 16 and a bus common to all said line and link circuits, means responsive to link busy conditions for selectively marking said common bus from said busy link, means associated with said line circuits and responsive to said selective marking on said common bus for inhibiting the extension of a connection to said busy link, and means associated with a called one of said lines for precluding a response to said selective marking on said common bus to enable the extension of a connection to said busy link.

20. The system of claim 19 wherein said means for marking said common bus comprises a two input AND gate controlled electronic switch, means for energizing one input of said AND gate during periods when a connection may be extended through said network, means for energizing the other input of said AND gate during periods when an assigned general purpose link is idle, means selectively responsive to the output of said AND gate for causing said electronic switch to apply either a call inhibiting or a call enabling potential to said common bus, means effective during the extension of connections to said general purpose links for applying the potential on said common bus to inhibit or enable the extension of calls through said network, and means effective during the extension of connections to said special purpose links for inhibiting the effects of any potentials on said common bus.

21. An electronic switching telephone system comprising a self-seeking switching network for interconnecting a plurality of telephone subscriber lines and a plurality of connection controlling link circuits, a first group of said link circuits having general purpose means for generally controlling the extension of calls through said network, a second group of said link circuits having special purpose means for controlling specific call features, means operative on a time sharing basis for assigning said general purpose link circuits to provide control conditions on a call function basis, means responsive to a calling condition on one of said subscriber lines for extending a first connection from said calling line through said network to a general purpose link circuit then assigned on said time sharing basis to serve said calling line, means in said connected general purpose link circuit selectively responsive to particular signals received from said calling line for causing the extension of a second connection from said calling line through said network to a special purpose link which provides the specific call feature indicated by said particular signal, means for releasing said first connection and said connected general purpose link circuit and for thereafter serving the call under the control of said connected special purpose link circuit, and means responsive to conditions requiring a connection between a line and said special purpose link circuit for enabling the extension of a connection from at least one of said line circuits to said connected special purpose link and inhibiting the extension of connections from all other of said line circuits.

22. An electronic switching telephone system comprising a current controlled, self-seeking switching network, a plurality of telephone subscriber line circuits connected to one side of the network and a plurality of connection controlling link circuits connected to the other side of the network, means for extending calling line connections through the network on a random call basis, and means responsive to conditions requiring a connection between a called line circuit and one of said link circuits for extending a called line connection through said network on a one-at-a-time basis.

23. The system of claim 22 and a bus common to all said line circuits and said link circuits, means responsive to link busy conditions for marking said common bus to prevent extension of switch paths through said networks to said busy links, means associated with said called one of said line circuits for causing that line circuit to establish a switch path despite said marking on said bus, and means responsive to said marking on said bus for precluding the extension of switch paths from all other of said line circuits.

24. The system of claim 23 wherein said means for marking said common bus comprises a two input AND gate controlled electronic switch, means for energizing one input of said AND gate during periods when a connection may be extended through said network to a given link, means for energizing the other input of said AND gate during periods when said given link is idle and when said connection may be extended, and means responsive to the output of said AND gate for causing said electronic switch to apply a call inhibiting potential to said common bus when said link is busy and an enabling potential to said common bus when said link is idle.

25. The system of claim 24 wherein each of said line circuits includes three electronic switches, one of said switches providing means for identifying individual lines in said systems and causing the extension of said called line connections, a second of said switches comprising means responsive to connection request conditions from an associated line circuit for applying an end-marking potential to a line side point of access in said network, the third of said switches comprising means for selectively applying the potential on said common bus to said line side point of access as a clamping potential whereby said common bus potential prevents said end-marking during times when paths can not be extended through said network, means responsive to calling conditions for switching "on" the third switch in said line circuits whereby all calling condition line circuits attempt to extend a connection through said network if said clamping potential is not on said common bus, and means responsive to said first switch during called conditions for holding said third switch "off" to prevent any potentials on said common bus from reaching said line side point of access.

26. The system of claim 25 and means effective upon the extension of a path during a calling condition and responsive to the output said second switch for holding said third switch "off" to prevent any potentials on said common bus from reaching said line side point of access for the duration of said connection and a predetermined period of time after the release thereof, whereby said end-marking reappears at said line side point of access during said predetermined period of time for applying a firing potential to a second point of access on the link side of said network whereby a second path extends through said network before said third switch is able to switch "on."

27. An electronic switching system comprising a current controlled, self-seeking switching network, a plurality of line circuits connected to one side of the network and a plurality of link circuits connected to the other side of the network, some of said link circuits comprising general purpose means for controlling the extension of switch paths through said network and other of said link circuits comprising special purpose means for providing specific call features, means responsive to the initiation of a switch path request for extending connections from all requesting line circuits through the network on a random originating basis, means in a seized link circuit selectively responsive to particular signals occurring after the extension of a connection for causing the extension of a second connection through said network to one of said other link circuits, means for releasing said first connection and said first seized link circuit to leave the control over said connection in said other link circuit, and means responsive to a condition requiring a connection between a line and said other link circuit for extending another connection through said network on a one-at-a-time terminate basis.

28. The system of claim 27 and a bus common to all said line circuits and to said general purpose link circuits, means responsive to a busy link condition for selectively marking said common bus to inhibit the extension of connections thereto, means associated with a called one of said line circuits for inhibiting said selective marking on said common bus to enable the extension of a connection to said called line circuit, and means associated with all other of said line circuits for precluding a response to said selective marking on said common bus thus inhibiting the extensions of connection to such other line circuits.

29. An electronic switching system comprising a switching network having a plurality of lines connected to one side of the network and a plurality of link circuits connected to the other side of the network, means for extending switch paths through the network to connect to a link circuit on a random originating basis, and means responsive to a condition requiring a connection between a called line and said connected link circuit for extending a single switch path through said network to said connected link circuit on a one-at-a-time basis.

30. The system of claim 29 and a common bus extending throughout said system, means responsive jointly to said originating conditions and potentials on said common bus for causing all originating switch paths to search for an idle link, means responsive to the completion of one of said paths to a link for committing that link to serve said one path, means responsive to said connection required condition for inhibiting response to potentials on said common bus relative to said called one of said lines, and means responsive to said potentials on said bus and associated with all other of said lines for precluding the extension of switch paths from said other lines through said networks.

31. The system of claim 30 wherein each of said lines is connected to a line circuit having three electronic switches therein, means for operating one of said switches responsive to signals identifying the individual line circuit as said called line, a second of said switches comprises means for causing the extension of a switch path through said network, and the third of said switches comprises means for selectively applying said common bus potentials to inhibit the output of said second switch during times when paths cannot be extended through said network.

32. The system of claim 31 and wherein said third switch is interposed between said common bus and said network, means responsive to said second switch for switching "on" said third switch to apply any potentials on said common bus to said network during originate conditions, means jointly responsive to the extension of a connection through said network and to the output of said second switch for switching "off" said third switch for the duration of a connection and a predetermined period of time thereafter, and means responsive to a release of said connection and to a signal on the link side of said network during said predetermined period of time for extending another connection through said network.

33. An electronic system comprising a current controlled, self-seeking switching network, a plurality of first points of access associated with one side of the network and a plurality of second points of access associated with the other side of the network, means for assigning circuits connected to said second points of access for controlling the extension of switch paths through said network, a bus common to all said points of access, means for selectively marking said common bus responsive to the idle or busy condition of said circuits when assigned, means for enabling and inhibiting said first points of access responsive to said marking on said bus, whereby no switch paths may be extended to a busy circuit, means responsive to a condition requiring a connection to a specific one of said switch path controlling points of access for enabling the extension of a switch path from one of said first points of access despite said markings on said common bus, and means responsive to said selective marking for inhibiting the extension of switch paths from all other of said first points of access.

34. A line circuit for use in an electronic switching telephone system, said line circuit having three electronic switches, one of said switches providing means for identifying individual lines in said systems during said connection requiring conditions, a second of said switches comprising means responsive to connection request conditions from an associated line for applying a connection request potential to a switching network, and the third of said switches comprising means for selectively applying a clamping potential to the output of said second switch during times when paths cannot be extended through said network.

35. The line circuit of claim 34 and a common bus for enabling said network to extend connections, said third switch being interposed between common bus and the output of said second switch, means responsive to said second switch for switching "on" said third switch to apply any potentials on said common bus to said output of said second switch thereby providing said clamping potential if said path cannot be extended.

36. The line circuit of claim 35 and means responsive to the output of said first switch for holding said third switch "off" to prevent any potentials on said common bus from reaching said output of said first switch during conditions which require said connection.

37. The line circuit of claim 36 and means for holding said third switch "off" for a predetermined period of time after the release of a connection thereby causing said second switch to reapply a connection request signal during said predetermined time period.

38. In an electronic switching system, a call enabling circuit comprising a two input AND gate controlled electronic switch, means for energizing one input of said AND gate during periods when a connection may be extended through said system, means for energizing the other input of said AND gate during periods when an assigned control circuit is idle, and means responsive to the output of said AND gate for causing said electronic switch to apply either a call inhibiting or a call enabling potential to a common bus extending throughout said system.

No references cited.

ROBERT H. ROSE, *Primary Examiner.*

WILLIAM C. COOPER, *Examiner.*